(12) United States Patent
Shimizu

(10) Patent No.: US 12,427,979 B2
(45) Date of Patent: Sep. 30, 2025

(54) COLLISION AVOIDANCE ASSISTANCE APPARATUS

(71) Applicant: TOYOTA JIDOSHA KABUSHIKI KAISHA, Toyota (JP)

(72) Inventor: Kenichi Shimizu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 18/076,949

(22) Filed: Dec. 7, 2022

(65) Prior Publication Data

US 2023/0192079 A1 Jun. 22, 2023

(30) Foreign Application Priority Data

Dec. 21, 2021 (JP) ................................ 2021-206612

(51) Int. Cl.
*B60W 30/095* (2012.01)
*B60W 30/09* (2012.01)

(52) U.S. Cl.
CPC ........ *B60W 30/0956* (2013.01); *B60W 30/09* (2013.01); *B60W 2554/4046* (2020.02)

(58) Field of Classification Search
None
See application file for complete search history.

(56) References Cited

U.S. PATENT DOCUMENTS

| | | | |
|---|---|---|---|
| 8,788,176 B1 * | 7/2014 | Yopp | B60W 30/162 701/96 |
| 9,105,190 B2 | 8/2015 | Akiyama | |
| 9,393,960 B2 | 7/2016 | Kodaira | |
| 9,483,945 B2 | 11/2016 | Okita | |
| 9,873,412 B2 | 1/2018 | Moriizumi | |
| 10,300,912 B2 * | 5/2019 | Nishimura | B60W 30/09 |
| 10,793,147 B2 | 10/2020 | Kaminade | |
| 2014/0350815 A1 | 11/2014 | Kambe | |
| 2021/0061309 A1 | 3/2021 | Kawanai | |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |
| 2023/0033316 A1 * | 2/2023 | Yang | B60W 30/095 |

FOREIGN PATENT DOCUMENTS

| | | |
|---|---|---|
| JP | 11-039598 A | 2/1999 |
| JP | 2014-227000 A | 12/2014 |
| JP | 2018-149901 A | 9/2018 |
| WO | 2021/157220 A1 | 8/2021 |

* cited by examiner

*Primary Examiner* — James J Lee
*Assistant Examiner* — Andrew Sang Kim
(74) *Attorney, Agent, or Firm* — Dinsmore & Shohl LLP

(57) ABSTRACT

A collision avoidance assistance apparatus stars a collision avoidance control, when a control target object having a possibility of colliding with the host vehicle is determined to be present and a collision index value of the control target object satisfies a predetermined control start condition. If a continuous recognizing time being a time for which the control target object continues being detected is shorter than a predetermined continuous recognizing time threshold in a case where the host vehicle is determined to be turning, the apparatus does not start (or prohibits) the collision avoidance control to be started when the collision index value satisfies the control start condition.

4 Claims, 6 Drawing Sheets

COLLISION AVOIDANCE ASSISTANCE APPARATUS

CROSS-REFERENCE TO RELATED APPLICATIONS

This application claims priority to Japanese Patent Application No. 2021-206612 filed on Dec. 21, 2021, which is incorporated herein by reference in its entirety including the description, claims, drawings, and abstract.

TECHNICAL FIELD

The present disclosure relates to a collision avoidance assistance apparatus which performs a collision avoidance control based on information (target object information) on a target object that is present ahead of (or in front of) a host vehicle, the information being output by a target object sensor device.

BACKGROUND

A known collision avoidance assistance apparatus performs a collision avoidance control for avoiding a collision between a host vehicle and a target object, when a time (hereinafter, referred to a "predicted time length till collision" or a "time to collision") between a present time point and a time point at which the host vehicle is predicted to collide with the target object becomes equal to or shorter than a time threshold. The collision avoidance control includes a warning control to generate a warning to a driver of the host vehicle and an automatic brake control to stop the host vehicle by activating an automatic brake (braking).

Furthermore, a collision avoidance assistance apparatuses (hereinafter, referred to as a "conventional apparatus") disclosed in Japanese Patent Application Laid-Open No. 2018-149901 is configured to shorten (decrease) the time threshold, when a continuous curved structure (e.g., a guardrail) is detected.

The thus configured conventional apparatus can decrease a possibility that the collision avoidance control is performed even though the driver is ready to steer along a curved road". Therefore, the conventional apparatus can also decrease a possibility that the collision avoidance control that is performed in the above scene causes the driver to feel annoyed.

SUMMARY

As described later, it has turned out that there still be a case in which the collision avoidance control is unnecessarily performed while the host vehicle is turning, especially in an intersection.

More specifically, as in a scene A shown in FIG. 2, in some embodiments, the collision avoidance control may be performed when the time to collision becomes equal to or shorter than the time threshold in a case in which the host vehicle SV is traveling on a curved road Cur and a preceding vehicle PV is running more slowly than the host vehicle SV.

In contrast, as in a scene B and in a scene C, shown in FIG. 2, in some embodiments, when the host vehicle is turning in the intersection Int in order to make a right turn and an other vehicle is at a stop state to wait for a traffic light in an oncoming (opposite) lane on a road which the host vehicle is going to enter (proceed to), it is not appropriate that the collision avoidance control for (regarding) that other vehicle waiting for the traffic light in the oncoming lane be performed. This is because, in general, the host vehicle SV moves straight after it makes the right turn, and thus, is very unlikely to collide with that other vehicle waiting for the traffic light in the oncoming lane.

However, when a host vehicle path (or a host vehicle passing area) that is a predicted path of the host vehicle SV based on a turning movement of the host vehicle SV overlaps/intersects with one of positions of the other vehicles OV1-OV3, the conventional apparatus recognizes, as a control target object, that other vehicle whose position is the position that the host vehicle path overlaps/intersects with, and thus, sometimes performs the collision avoidance control for that other vehicle.

For example, in the scene B shown in FIG. 2, the host vehicle path overlaps/intersects with the position of the other vehicle OV1 (namely, a lead (first) vehicle among a plurality of other vehicles waiting for the traffic light), and therefore, the collision avoidance control (for that lead vehicle OV1) may be performed while the host vehicle SV is turning. As for this case, the present inventor has found that such an unnecessary collision avoidance control can be prevented from being performed by changing the above-described time threshold to a smaller value (shorter time) when it is determined that the host vehicle SV is turning as compared to (than) when it is determined that the host vehicle SV is not turning.

In the scene C shown in FIG. 2, the host vehicle path overlaps/intersects with the position of the other vehicle OV2 that is the second other vehicle, and thus, the collision avoidance control (for that second other vehicle OV2) may also be performed. In this case, the unnecessary collision avoidance control can often not be avoided only by changing the above-described time threshold to the smaller value as described above. The reason for this is that a time point at which the target object sensor device of the host vehicle SV starts to recognize the second other vehicle OV2 is late as compared to a time point at which the target object sensor device of the host vehicle SV starts to recognize the first other vehicle OV1, and a time to collision for the second other vehicle OV2 is often already very short (e.g., the time to collision is often shorter than the shortened time threshold) when it is determined that the second other vehicle OV2 is on the host vehicle path for the first time.

The present disclosure is made to cope with the problems described above. That is, one of objectives of the present disclosure is to provide a collision avoidance assistance apparatus capable of decreasing a possibility that the unnecessary collision avoidance control is performed while the host vehicle is turning.

An embodiment of a collision avoidance assistance apparatus according to the present disclosure comprises:

a target object sensor device (40) which detects a target object present ahead of a host vehicle and outputs target object information including information on a position of the target object which is detected;

a information obtaining device (50, 60, 80) which obtains host vehicle behavior information indicative of a behavior of the host vehicle; and a control unit (10, 20, 30).

The control unit is configured to:

when determining, based on the target object information and the host vehicle behavior information, that a control target object having a possibility of colliding with the host vehicle is present (step 420: Yes), produce a collision index value (TTC) indicative of the possibility based on at least the target object information of the control target object; and start a collision avoidance control to prevent a collision between the host vehicle and the control target object using an actuator (21, 31, 70) of the host vehicle when the collision index value satisfies a predetermined control start condition (step 435: Yes, step 445).

As described above, when the host vehicle attempts to make a right turn at an intersection in an area where a vehicle must keep left by the traffic regulation, a time point at which the second other vehicle or one of the following other vehicles, among a plurality of other vehicles that are at the stop state in the oncoming (opposite) lane on the road which the host vehicle is going to enter (proceed to) after the right turn, starts to be recognized is delayed as compared to a time point at which the first other vehicle among the plurality of the other vehicles starts to be recognized. The similar scene happens, when the host vehicle attempts to make a left turn at an intersection in an area where a vehicle must keep right by the traffic regulation, In view of the above, the the control unit is configured not to start (or configured to prohibit) the collision avoidance control to be started when the collision index value satisfies the control start condition (step 455: No), if a continuous recognizing time (Trcg) being a time for which the control target object continues being detected by the target object sensor device is shorter than a predetermined continuous recognizing time threshold (Trth) in a case where the host vehicle is determined to be turning based on the host vehicle behavior information (step 425: Yes).

The continuous recognizing time of the second other vehicle or one of the following other vehicles, among the plurality of other vehicles that are at the stop state in the oncoming (opposite) lane after the right turn or the left turn of the host vehicle, is relatively short. Therefore, according to the above configuration, since the collision avoidance control for the object whose continuous recognizing time is short is not started, a possibility that the unnecessary collision avoidance control for the second other vehicle or one of the following other vehicles among the plurality of other vehicles is performed can be decreased.

In some embodiments, the control unit is configured to change the control start condition in such a manner that the control start condition becomes harder to be satisfied by the collision index value (step 450, step 430), when the host vehicle is determined to be turning based on the host vehicle behavior information (step 425: Yes), as compared to when the host vehicle is not determined to be turning based on the host vehicle behavior information (step 425: No).

More specifically, the the control unit is configured is configured to:
calculate, as the collision index value, a time to collision that is a time length to a time point at which the host vehicle is predicted to collide with the control target object (step 435); and
determine that the control start condition becomes satisfied (step 435: Yes), when the time to collision is equal to or shorter than a collision avoidance time threshold (TTCth).

The control unit is further configured to:
change the control start condition in such a manner that the control start condition becomes harder to be satisfied by the collision index value, by setting the collision avoidance time threshold of when the host vehicle is determined to be turning based on the host vehicle behavior information (step 425: Yes) to a value (Tshort) smaller than the collision avoidance time threshold (Tlong) of when the host vehicle is not determined to be turning based on the host vehicle behavior information (step 450, step 430).

In other words, the control unit is further configured to:
set the collision avoidance time threshold of when the host vehicle is not determined to be turning based on the host vehicle behavior information to a first value (i.e., traveling-straight time threshold Tlong) (step 430); and
set the collision avoidance time threshold of when the host vehicle is determined to be turning based on the host vehicle behavior information to a second value (i.e., turning time threshold Tshort that is shorter than traveling-straight time threshold Tlong) (step 450).

According to the above configurations, the collision avoidance control is not started when the host vehicle is turning until the host vehicle comes closer to the control target object (or, the possibility of the collision becomes higher) than when the host vehicle is not turning. Thus, a possibility that the unnecessary collision avoidance control for the first (lead) other vehicle among the plurality of other vehicles that are at the stop state in the oncoming (opposite) lane after the right turn or the left turn of the host vehicle is performed can be decreased.

The present disclosure includes a program that causes a computer (e.g., a processor of a microcomputer) to perform functions for implementing the above-described controls, and a method for implementing the above-described controls.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure should not be limited to those in the embodiments defined by the names and/or the symbols.

DETAILED DESCRIPTION

<Configuration>

Figure 1:
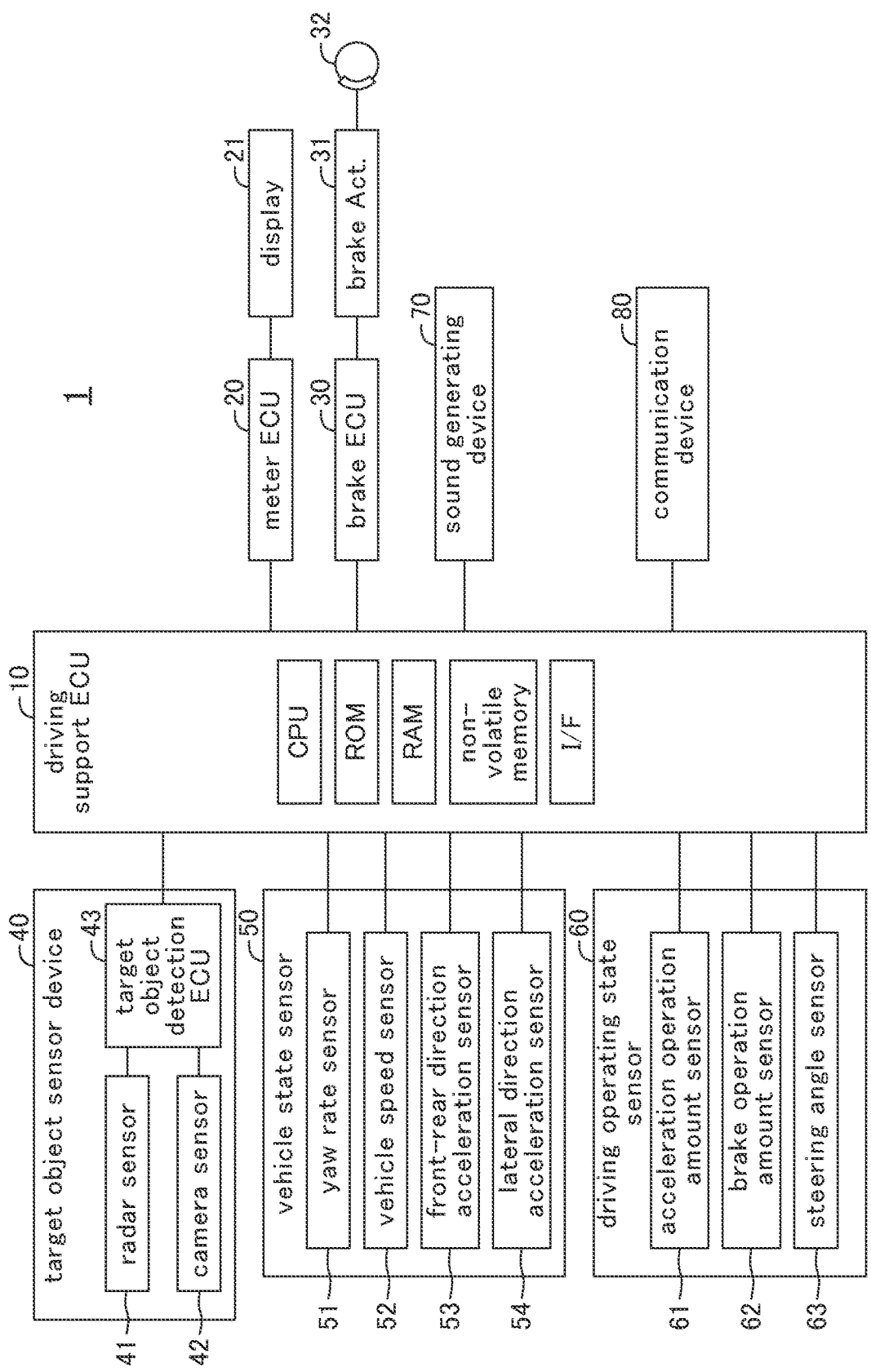
FIG. 1 is a schematic diagram of a collision avoidance assistance apparatus according to an embodiment of the present disclosure.

A "collision avoidance assistance apparatus 1 according to an embodiment of the present disclosure" shown in FIG. 1 is applied to (or installed in) a vehicle. Hereinafter, the vehicle in which the collision avoidance assistance apparatus 1 is installed is referred to as a "host vehicle" in order to discriminate the vehicle from other vehicles.

The collision avoidance assistance apparatus 1 comprises a driving support ECU 10, a meter ECU 20, a brake ECU 30, a target object sensor device 40, a vehicle state sensor 50, a driving operating state sensor 60, a sound generating device 70 including a buzzer, and a communication device 80.

Each of the driving support ECU 10, the meter ECU 20, and the brake ECU 30 is an Electronic Control device including a microcomputer as a main component. An "ECU" is an abbreviation of an "Electronic Control Unit", and is sometimes referred to as a controller or a computer. The microcomputer includes a CPU, a ROM, a RAM, a non-volatile memory, and an interface (I/F). The CPU is configured and/or programmed to realize various functions by executing instructions (routines, or programs) stored in the ROM. Some or all of those ECUs and a target object detection ECU 43 described later may be integrated into a single ECU. These ECUs are connected with each other so as to be able to mutually exchange data/information through a CAN (Controller Area Network). Hereinafter, the driving support ECU 10 is simply referred to as a "DSECU 10".

The DSECU 10 is connected with the target object sensor device 40, the vehicle state sensor 50, and the driving operating state sensor 60, and is configured to receive signals from them.

The target object sensor device 40 detects a target object that is preset ahead of (or in front of) the host vehicle (i.e., the device 40 detects an object that is present in a fan-shaped detection area with a certain central angle in front of the host vehicle), and generates target object information including a position of the detected target object. More specifically, the target object sensor device 40 includes a radar sensor 41, a camera sensor 42, and the target object detection ECU 43.

The radar sensor 41 is arranged at (fixed to) a position (hereinafter, referred to as a "front end center") in the vicinity of a center in a vehicle body width direction of a vehicle body of the host vehicle and at a front end of the vehicle body. The radar sensor 41 comprises an unillustrated radar transmitting-receiving section and an unillustrated radar processing section.

The radar transmitting-receiving section transmits/radiates electric wave (e.g. radar with a millimeter-wave band) in a detection area that expands (fans out) with a first center angle, frontward of the host vehicle from the front end center. The electric wave radiated/transmitted from the radar transmitting-receiving section is reflected by a target object present in the detection area. The radar transmitting-receiving section receives the reflected wave. The radar processing section detects, based on the radiated electric wave and the received reflected wave, the target object present in the detection area. The radar processing section further produces/generates information (hereinafter, referred to as "radar target object information") on the detected target object, every time a predetermined time elapses. The radar sensor 41 (the radar processing section) transmits the radar target object information to the target object detecting ECU 43

The radar target object information includes:
a target object ID that identifies/specifies the detected target object;
information on a position of the detected target object with respect to the host vehicle (e.g., a distance between the detected target object and the host vehicle in a front-rear direction of the host vehicle, and a direction of the detected target object);
a relative speed of the detected target object (with respect to the host vehicle); and
a radar recognizing time TR that is a time for which the target object given the target object ID continues to be detected (by the radar sensor 41).

The camera sensor 42 comprises an unillustrated stereo camera and an unillustrated image processing section.

The stereo camera obtains a pair of right and left image data every time a predetermined time elapses by taking (capturing) a picture of a mainly right area ahead of (in front of) the host vehicle with a predetermined angle of view and a picture of a mainly left area ahead of (in front of) the host vehicle with the predetermined angle of view.

The image processing section detects, based on the pair of right and left image data obtained by the stereo camera, a target object present ahead of the vehicle. The image processing section further produces/generates information (hereinafter, referred to as "camera target object information") on the detected target object, every time a predetermined time elapses. The camera sensor 42 (the image processing section) transmits the camera target object information to the target object detecting ECU 43

The camera target object information includes:
a target object ID that identifies/specifies the detected target object;
information on a position of the detected target object with respect to the host vehicle (e.g., a distance between the detected target object and the host vehicle in the front-rear direction of the host vehicle, and a position of the detected target object in the vehicle body width direction of the host vehicle with respect to the host vehicle); and
a camera recognizing time TC that is a time for which the target object given the target object ID continues to be detected (by the camera sensor 42).

The camera sensor 42 recognizes, based on the pair of right and left image data, a right lane marker of a road on which the host vehicle is traveling and a left lane marker of the road. The lane marker is typically a white line or a yellow line, and may be simply referred to as a "white line", hereinafter. The camera sensor 42 further obtains a position of the host vehicle (in a lane width direction) with respect to the white line, and obtains a parameter regarding a shape of the road (e.g., a curvature of the road).

The target object detecting ECU 43 synthesizes (fuses) the radar target object information transmitted from the radar sensor 41 and the camera target object information transmitted from the camera sensor 42 so as to finally recognize a target object ahead of the vehicle and produce target object information on the finally recognized target object. In addition, the target object detecting ECU 43 provides the finally recognized target objects with respective target object IDs. The target object detecting ECU 43 obtains, based on the radar recognizing time TR and the camera recognizing time TC, a continuous recognizing time Trcg that is a time for which the the target object detecting ECU 43 continues detecting a target object given the target object ID by the target object detecting ECU 43. The target object detecting ECU 43 transmits, as fusion target object information, thus obtained information including the fused target object information, the target object ID, and the continuous recognizing time Trcg, to the DSECU 10 every time a predetermined time elapses.

Even when a certain target object is detected only by one of the radar sensor 41 and the camera sensor 42, the target object detecting ECU 43 transmits, as target object information on the finally recognized target object, target object information (namely, either the radar target object information or the camera target object information) on that target object to the DSECU 10. It should be noted that, the target object detecting ECU 43 may be configured to transmit the fusion target object information on a certain target object only when that certain target object is detected by both of the radar sensor 41 and the camera sensor 42.

It should also be noted that, the target object detecting ECU 43 may be integrated into the DSECU 10. In other words, the above-described functions realized/implemented by the target object detecting ECU 43 may be realized/implemented by the DSECU 10. Furthermore, the target object sensor device 40 may comprise only one of the radar sensor 41 and the camera sensor 42. The target object sensor device 40 may includes other types of a target object sensor (for instance, a LiDAR=Laser Imaging Detection and Ranging).

The DSECU 10 is configured to be capable of performing a collision avoidance control, as one of driving supporting controls for supporting driving operations of the driver. The collision avoidance control may sometimes referred to as a pre-crash safety control (PCS control). As described later, the collision avoidance control includes a warning control and an automatic brake control.

The warning control is a control to urge the driver to pay attention to (or to be cautious about) a target object by generating a warning sound from the sound generating device 70 and/or causing the display 21 to display a caution mark, when it is determined that a probability (possibility, likelihood) that the host vehicle collides with the target object reaches a first stage.

The automatic brake control is a control to avoid a collision between the host vehicle and the target object by automatically applying a brake force to the host vehicle so as to stop the host vehicle, when it is determined that the probability that the host vehicle collides with the target object reaches a second stage that is higher than the first stage.

The vehicle state sensor 50 includes a plurality of the following sensors, each detecting/obtaining a parameter indicative of a state of the host vehicle.

A yaw rate sensor 51 that detects a yaw rate Yr of the host vehicle.

A vehicle speed sensor 52 that detects a running speed (vehicle speed) SPD of the host vehicle.

A front-rear direction acceleration sensor 53 that detects a front-rear direction acceleration Gx that is an acceleration of the host vehicle in the front rear direction.

A lateral direction acceleration sensor 54 that detects a lateral direction acceleration Gy that is an acceleration of the host vehicle in a lateral (vehicle body width) direction.

The driving operating state sensor 60 includes a plurality of the following sensors, each detecting/obtaining a parameter indicative of a driving operating state of the driver of the host vehicle.

An acceleration operation amount sensor 61 that detects an operation amount (i.e., an acceleration pedal operation amount AP) of an acceleration pedal of the host vehicle.

A brake operation amount sensor 62 that detects an operation amount (i.e., a brake pedal operation amount BP) of a brake pedal of the host vehicle.

A steering angle sensor 63 that detects a steering angle θ of a steering wheel of the host vehicle.

It should be noted that the information that the DSECU 10 obtains from the vehicle state sensor 50 and the driving operating state sensor 60 may be referred to as "host vehicle behavior information". Some of all of sensors included in the vehicle state sensor 50 and/or the driving operating state sensor 60 may be connected to an ECU other than the DSECU 10. In that case, the DSECU 10 receives an output signal of that sensor from the ECU to which that sensor is connected via CAN.

The DSECU 10 is connected with the meter ECU 20, the brake ECU 30, the sound generating device 70, and the communication device 80.

The meter ECU 20 is connected with a display 21 disposed/arranged at a position facing a driver's seat. The meter ECU 20 controls images to be displayed on the display 21 in accordance with a display instruction transmitted from the DSECU 10. It should be noted that the display 21 may be said to be an actuator that realizes/implements a function to display information.

The brake ECU 30 is connected with a brake actuator 31. The brake actuator 31 is disposed in an unillustrated hydraulic circuit between an unillustrated master cylinder and friction brake devices 32. The friction brake devices 32 are provided to respective left-right and front-rear wheels (i.e., all of the wheels). The brake actuator 31 adjusts/changes a pressure of hydraulic oil supplied to the corresponding wheel cylinder that is installed in a brake caliper of each of the wheels in accordance with an instruction transmitted from the brake ECU 30. The brake actuator 31 activates the wheel cylinder to press a brake pad against a brake disc so as to generate a frictional brake force. In this manner, the brake ECU 30 can control a brake force applied to the host vehicle by controlling the brake actuator 31.

The sound generating device 70 is activated by the sound generating instruction transmitted from the DSECU 10 so as to generating a waring sound in a manner specified by the sound generating instruction. It should be noted that the sound generating device 70 may be said to be an actuator that realizes/implements a function to generate a warning sound.

The communication device 80 obtains information (host vehicle behavior information) on the behavior of the host vehicle and information present ahead of or in the vicinity of the host vehicle through a communication between the DSECU 10 and devices outside the host vehicle (e.g., a roadside communication device, a traffic information center, or the like). The communication device 80 can provide the DSECU 10 with thus obtained information, every time a predetermined time elapses.

(Outline of Collision Avoidance Control)

The DSECU 10 performs the collision avoidance control (the warning control and the automatic brake control). The collision avoidance control itself has been well-known. Thus, it will be briefly described.

As illustrated in the scene A in FIG. 2, the DSECU 10 predicts a passing area (a belt-like area between a broken line SL and a broken line SR shown in FIG. 2) SP of the host vehicle SV within a period (prediction period) from a present time point to a time point a predetermined constant time later from the present time point. This passing area SP of the host vehicle SV may sometimes be referred to as "the host vehicle path SP or the host vehicle passing area SP". A specific example of a way to predict the host vehicle passing area SP will be described later.

Figure 2:
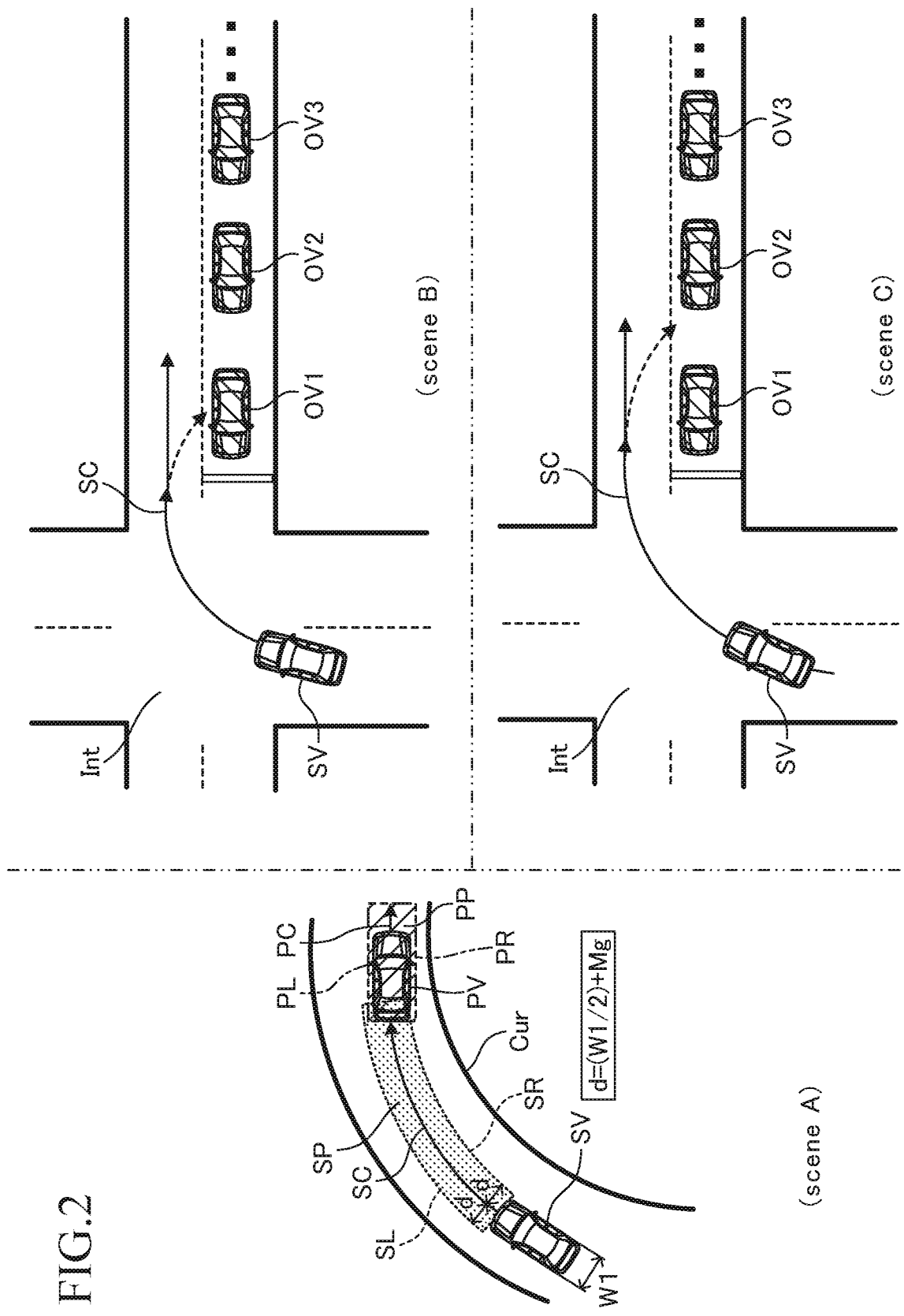
FIG. 2 is a drawing for describing operations of the collision avoidance assistance apparatus shown in FIG. 1.

Similarly, the DSECU 10 predicts, based on the fusion target object information, a passing area (a belt-like area between a broken line PL and a broken line PR shown in FIG. 2) PP of "a target object detected by the target object sensor device 40 (a preceding vehicle PV that is an other vehicle in the example shown in scene A in FIG. 2)" within the prediction period. The target object that the target object sensor device 40 detects is not necessarily an other vehicle, however, it is assumed that the target object that the target object sensor device 40 detects is an other vehicle PV in order to simplify the descriptions, hereinafter.

The passing area PP of the other vehicle PV is an area through which a rear end of the other vehicle PV passes within the prediction period, and may sometimes be referred to as "an other vehicle path PP or an other vehicle passing area PP". A specific example of a way to predict the other vehicle passing area PP will be described later.

Thereafter, the DSECU 10 determines whether or not the host vehicle passing area SP and the other vehicle passing area PP intersect with each other. When the DSECU 10 determines that the host vehicle passing area SP and the other vehicle passing area PP intersect with each other, the DSECU 10 recognizes the other vehicle (target object) corresponding to this other vehicle passing area PP as a control target object (namely, a target object or an obstacle, with which the host vehicle is likely to collide or has a possibility of colliding with the host vehicle).

When the DSECU 10 recognizes the control target object, the DSECU 10 calculate a time to collision TTC for/of the control target object. The time to collision TTC is a time (time length) for the host vehicle SV to take to move from "a present position of the host vehicle SV" to "a position (intersection position) at which the host vehicle passing area SP and the other vehicle passing area PP intersect with each other for the first time" under a assumption that the host vehicle travels with maintaining the present (running) state. For example, when the host vehicle SV is running straight at the vehicle speed V and the distance between the present position of the host vehicle SV and the intersection position is a distance L, the time to collision TTC is calculated/obtained by dividing the distance L by the vehicle speed V (TTC=L/V). When it is assumed that the host vehicle SV travels along a circular arc having a radius r, the time to collision TTC can be calculated/obtained in accordance with a well-known equation using the radius r and the vehicle speed V (for example, TTC=r·θ/V, where θ is a central angle of the circular arc).

The time to collision TTC is an index value (hereinafter, sometimes be referred to as a "collision index value") indicative of a possibility or an imminence that the host vehicle SV collides with the control target object. The possibility that the host vehicle SV collides with the control target object is higher, as the time to collision TTC is shorter. It should be noted that the collision index value is not limited to the time to collision TTC. For instance, the DSECU 10 may obtain the collision index value by applying "the vehicle speed SPD, the steering angle θ, and a position of the host vehicle SV with respect to the intersection position (e.g. a distance between the host vehicle and the intersection position)" to a predetermined look-up table. In this case, the collision index value may be a value that is greater as the possibility that the host vehicle SV collides with the control target object is higher. In other words, the collision index value is a value that has a correlation (a monotonic increasing relationship or a monotonic decreasing relationship) with the possibility that the host vehicle SV collides with the control target object.

When the possibility that the host vehicle SV collides with the control target object (i.e., the collision index value) reaches a warning threshold (for example, the time to collision TTC becomes equal to or smaller than a warning time threshold TWth), the DSECU 10 recognizes the control target object as an obstacle for warning. When the DSECU 10 recognizes the obstacle for warning, the DSECU 10 causes the sound generating device 70 to intermittently generate a warning sound by transmitting the sound generating instruction to the sound generating device 70, and causes the display 21 to display letters including "Brake!" by transmitting the display instruction to the display 21. Namely, the DSECU 10 generates/issues a warning to the driver. A series of the controls to issue this warning is the warning control.

Thereafter, when the possibility that the host vehicle SV collides with the control target object becomes greater to reach a brake threshold (for example, the time to collision TTC becomes equal to or smaller than a brake time threshold TBth that is smaller than the warning time threshold TWth), the DSECU 10 applies the frictional brake force to the host vehicle SV to stop the host vehicle SV by transmitting the instruction (automatic brake instruction) to the brake ECU 30. A series of the controls to this braking is the automatic brake control.

(Outline of Operations of the Collision Avoidance Assistance Apparatus 1)

The conventional apparatus also performs the above-described collision avoidance control. Therefore, as shown in the scene A in FIG. 2, in which the host vehicle SV is traveling on the curved road Cur and the preceding vehicle PV is running more slowly than the host vehicle SV, the conventional apparatus performs the warning control when the time to collision TTC becomes equal to or smaller than the warning time threshold TWth, and performs the automatic brake control when the time to collision TTC becomes equal to or smaller than the brake time threshold TBth. Accordingly, the collision between the host vehicle SV and the target object (the preceding vehicle PV in this scene) can be avoided.

Whereas, as shown in the scene B in FIG. 2, in which the host vehicle SV is turning in the intersection Int in order to make a right turn and the other vehicle OV1 is at a stop state to wait for a traffic light (green light) in an oncoming (opposite) lane on a road which the host vehicle SV is going to enter (proceed to) after the right turn, the collision avoidance control for that other vehicle OV1 may undesirably be performed by the conventional apparatus. More specifically, there is a case where the host vehicle path (host vehicle passing area) at a time point at which the host vehicle SV starts making the right turn intersects with the position of the other vehicle OV1 that has been at the stop state and is waiting for the traffic light. In this case, the other vehicle OV1 is recognized as the control target object. Then, when the host vehicle SV continues making the right turn, the time to collision TTC becomes equal to or smaller than the warning time threshold TWth, or further becomes equal to or smaller than the brake time threshold TBth. As a result, the collision avoidance control (the warning control and the automatic brake control) that is unnecessary is performed.

In addition, as shown in the scene C in FIG. 2, there is a case where the host vehicle path (host vehicle passing area) after the time point at which the host vehicle SV starts making the right turn intersects with the position of the other vehicle OV2 that is the second other vehicle from the first (lead) vehicle among a plurality of other vehicles waiting for the traffic light). In this case as well, since the other vehicle OV2 is recognized as the control target object, the unnecessary collision avoidance control (the warning control and the automatic brake control) for the other vehicle OV2 may be performed.

Figure 3:
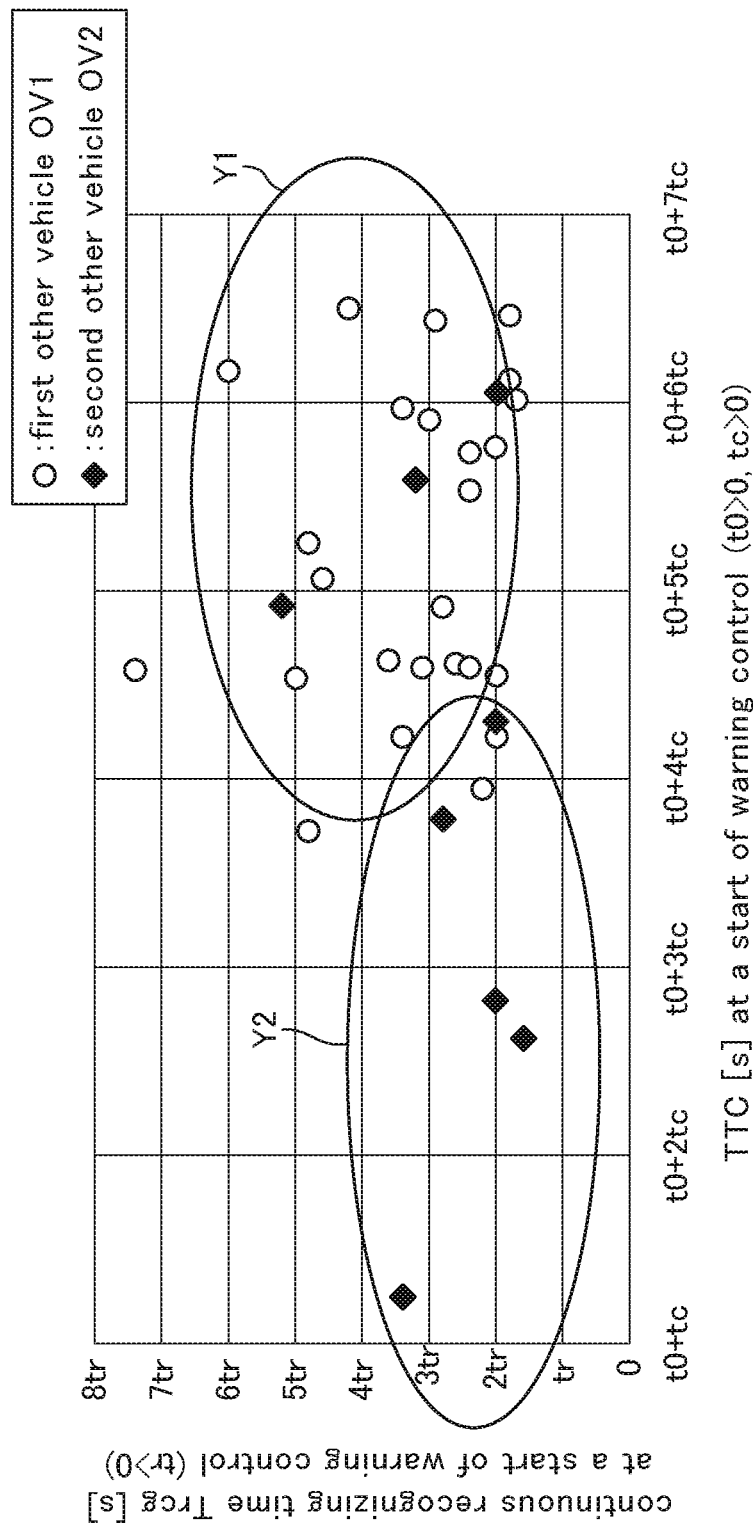
FIG. 3 is a graph relating to cases where the conventional apparatus performed unnecessary collision avoidance control.

FIG. 3 is a graph showing cases where the conventional apparatus performed the above-described unnecessary warning control as the collision avoidance control. The inventor found the following first finding 1 and the following second finding 2 from the graph shown in FIG. 3. It should be noted that the conventional apparatus changes the warning time threshold TWth based on the following equation.

$$TWth = f(LR) \cdot TTCbth$$

Figure 5:
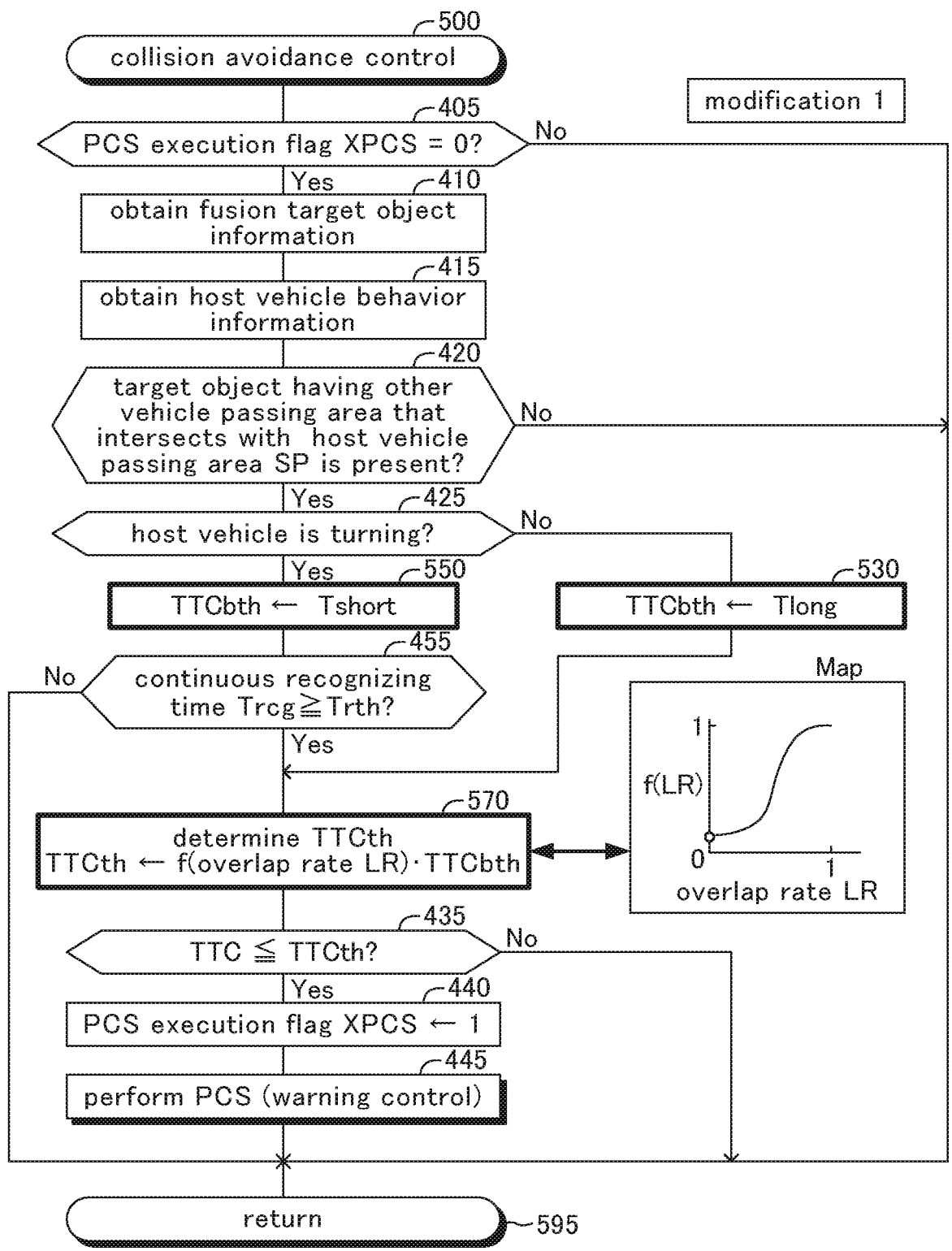
FIG. 5 is a flowchart illustrating a routine executed by a CPU of a first modification 1 of the driving support ECU shown in FIG. 1.
Figure 6:
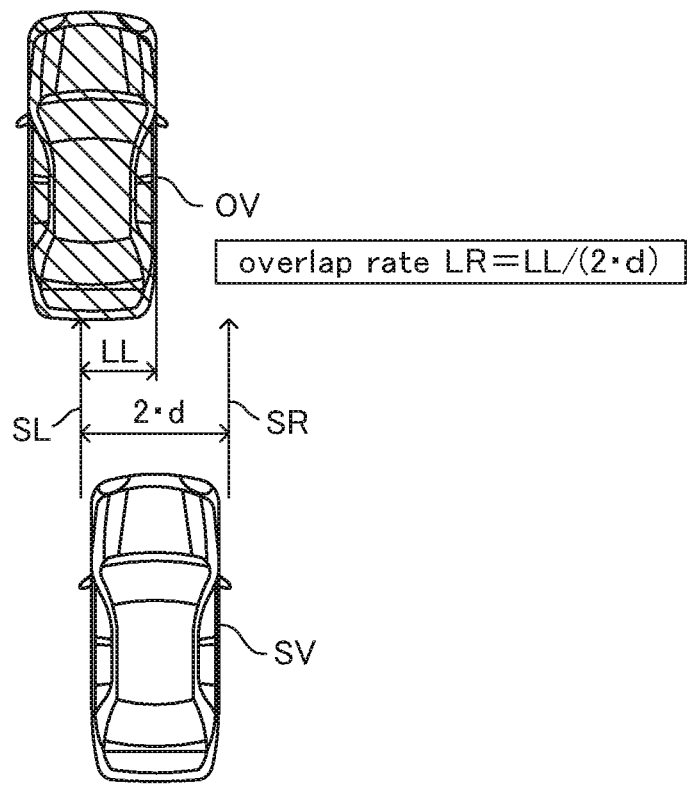
FIG. 6 is a plan view of a host vehicle and a target object, for describing an overlap rate.

The function f(LR) in the above equation is a coefficient varying depending on an "overlap rate LR between the host vehicle and the control target object" that is indicative of a degree of overlapping between the two when it is assumed the two collide with each other (i.e., a value LR (=LL/(2·d)) shown in FIG. 6). The function f(LR) varies in a range larger than 0 and equal to or smaller than 1. The value of the function f(LR) is "1" when the overlap rate LR is a value that is about "1", and becomes larger to "1" as the overlap rate LR comes closer to the value that is about "1" (refer to a block Map shown in FIG. 5). The TTCbth is a constant basic value.

(First Finding 1)

As understood from the plots (dots, marks) in an ellipse Y1 shown in FIG. 3, as for the first other vehicle OV1, the time to collision TTC of when the warning control was started is relatively long. Namely, in the example shown in FIG. 3, any of the time to collision TTC of when the warning control was started is longer than a time that is about a time of (t0+4·tc). Therefore, by setting the warning time threshold TWth (namely, a collision avoidance time threshold TTCth for the warning control) to a value smaller than a value used as the warning time threshold TWth of when the host vehicle SV is running straight, a possibility that the warning control as the collision avoidance control is unnecessarily performed for (with respect to) the other vehicle OV1 can be decreased. Similarly, by setting the brake time threshold TBth (namely, a collision avoidance time threshold TTCth for the automatic brake control) to a value smaller than a value used as the brake time threshold TBth of when the host vehicle SV is running straight, a possibility that the automatic brake control as the collision avoidance control is unnecessarily performed for (with respect to) the other vehicle OV1 can be decreased.

(Second Finding 2)

As understood from the plots (dots, marks) in an ellipse Y2 shown in FIG. 3, as for the second other vehicle OV2, the time to collision TTC of when the warning control was started is relatively short. Therefore, setting the warning time threshold TWth (the collision avoidance time threshold TTCth for the warning control) to a value smaller than a value used as the warning time threshold TWth of when the host vehicle SV is running straight may not be able to decrease the possibility that the warning control as the collision avoidance control is unnecessarily performed for (with respect to) the other vehicle OV2.

Whereas, a time (namely, the continuous recognizing time Trcg) for which the other vehicle OV2 continued being recognized by the target object sensor device 40 until the time point at which the warning control for the second other vehicle OV2 was started is shorter than the continuous recognizing time Trcg until the time point at which the warning control for the first other vehicle OV1 was started. This may be because, since the detection area of the target object sensor device 40 expands (fans out) frontward of the host vehicle with a certain predetermined center angle, the second other vehicle OV2 cannot be detected immediately after the host vehicle SV starts making the right turn, however, the the second other vehicle OV2 can start to be detected at a time point at which a short time elapses after the host vehicle SV starts making the right turn.

Based on the above findings, the inventor has come to the conclusion that it is possible to decrease the possibility that the warning control as the collision avoidance control is unnecessarily performed for (with respect to) the other vehicle OV2, by prohibiting the warning control as the collision avoidance control for the target object whose continuous recognizing time Trcg is shorter than (does not reach) a predetermined continuous recognizing time threshold Trth.

In view of the above, the collision avoidance assistance apparatus 1 is configured to have features as follows.

(1) The collision avoidance assistance apparatus 1 is configured to change the collision avoidance time threshold TTCth of when the host vehicle is turning to a value smaller than the collision avoidance time threshold TTCth of when the host vehicle is not turning. More specifically, the collision avoidance assistance apparatus 1 is configured to change the warning time threshold TWth of when the host vehicle is turning to a value smaller than the warning time threshold TWth of when the host vehicle is not turning. Similarly, the collision avoidance assistance apparatus 1 is configured to change the brake time threshold TBth of when the host vehicle is turning to a value smaller than the brake time threshold TBth of when the host vehicle is not turning.

(2) The collision avoidance assistance apparatus 1 is configured in such a manner that it does not start a "collision avoidance control that is designed to be started when the the collision index value TTC satisfies a specific condition defined by the collision avoidance time threshold TTCth" for a target object whose continuous recognizing time Trcg is shorter than (does not reach) the continuous recognizing time threshold Trth, when the host vehicle is turning.

(Specific Operation)

Figure 4:
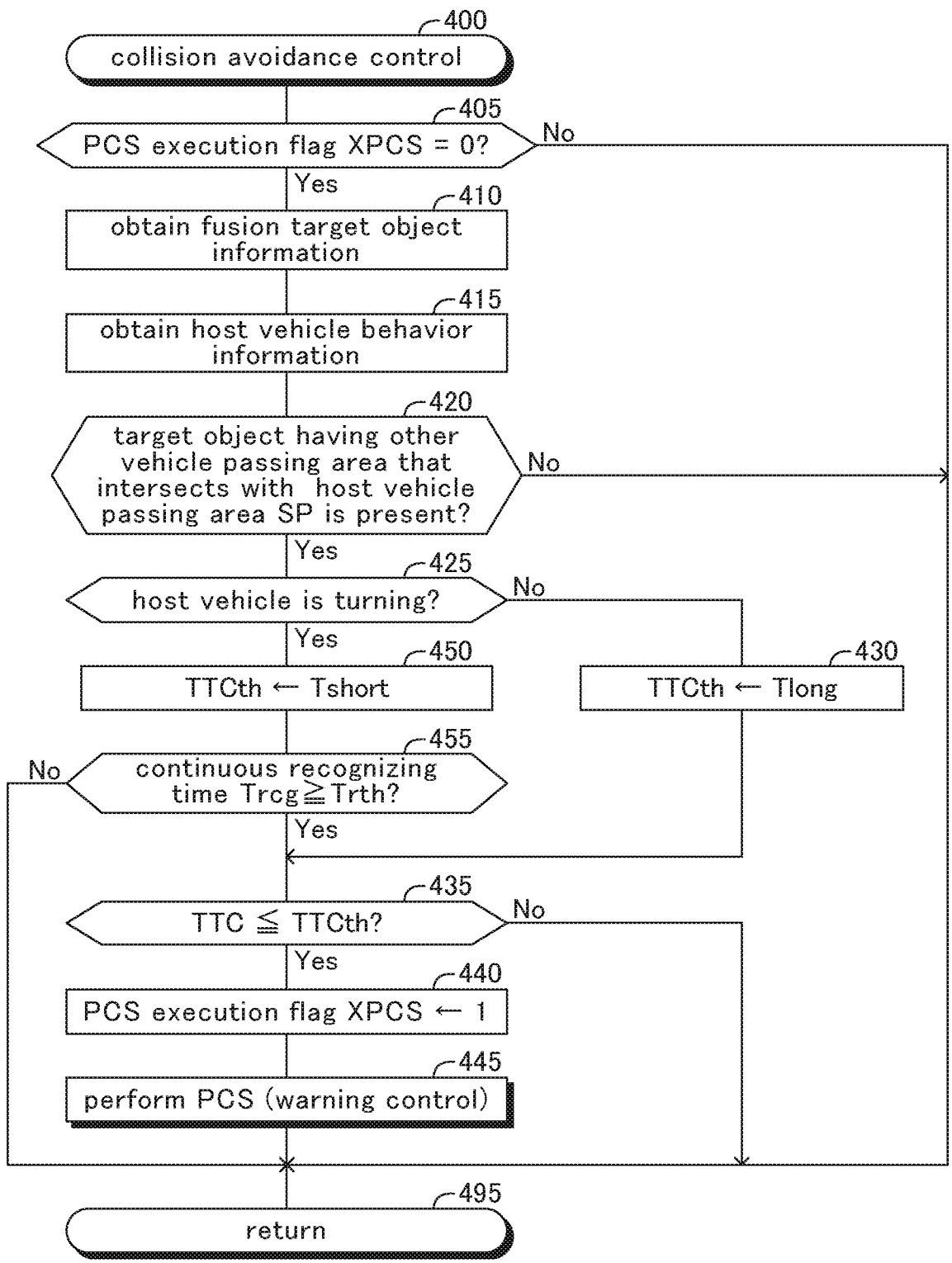
FIG. 4 is a flowchart illustrating a routine executed by a CPU of a driving support ECU shown in FIG. 1.

The CPU of the DSECU 10 (hereinafter, simply referred to as the CPU) is configured or programmed to execute a routine shown by a flowchart in FIG. 4 every time a predetermined time elapses. The routine shown in FIG. 4 is to perform the above-described warning control as the collision avoidance control. It should be noted that a routine similar to the routine shown in FIG. 4 enables the CPU to perform the above-described automatic brake control as the collision avoidance control.

When an appropriate time point comes, the CPU starts processing from step 400 in FIG. 4, and proceeds to step 405. At step 405, the CPU determines whether or not a value of an PCS execution flag XPCS is "0". When the value of the PCS execution flag XPCS is "0", the flag XPCS indicates that the collision avoidance control (in this case, the warning control) is not being performed/executed. Whereas, when the value of the PCS execution flag XPCS is "1", the flag XPCS indicates that the collision avoidance control is being performed/executed (refer to step 440 described later). This means that the CPU determines whether a current state is a state where the collision avoidance control is not being performed at step 405. It should be noted that the value of the PCS execution flag XPCS is set to "0" through an initialization routine that is executed by the CPU when a position of an unillustrated ignition key switch of the host vehicle SV is changed from an off position to an on position.

It is now assumed that the value of the PCS execution flag XPCS is "0". In this case, the CPU makes a "Yes" determination at step 405, sequentially executes processes of step 410 and step 415, and proceeds to step 420.

Step 410: the CPU obtains the fusion target object information from the target object sensor device 40 (the target object detecting ECU 43).

Step 415: the CPU obtains the host vehicle behavior information from the vehicle state sensor 50 and the driving operating state sensor 60.

At step 420, the CPU predicts (obtains) the host vehicle passing area, using the host vehicle behavior information, according to a method described below. In addition, the CPU predicts (obtains) the other vehicle passing area, using the host vehicle behavior information and the fusion target object information, according to a method described below.

<<Prediction of the Host Vehicle Passing Area>>

The DSECU 10 determines/obtains "a turning radius R1 and a center of turning" of the host vehicle SV at the present time point, based on "the yaw rate Yr, the lateral acceleration Gy, the vehicle speed SPD, the steering angle θ, and the like" of the host vehicle SV at the present time point. Thereafter, the DSCEU determines (predicts) a "center point moving path SC that is a path along/on which the front end center of the host vehicle SV will move within the prediction period that is a period having the constant time length", based on the turning radius R1 and the center of turning, under the assumption that the host vehicle SV moves/runs while maintaining the present state in the prediction period (refer to the scene A shown in FIG. 2).

Then, the DSECU 10 obtains, as a left front end moving path SL, a line obtained by shifting the center point moving path SC leftward in the body width direction by a distance d. More precisely, the left front end moving path SL is a circular arc having a radius (R1+d) around the center of turning when the host vehicle SV is making a right turn, and is a circular arc having a radius (R1−d) around the center of turning when the host vehicle SV is making a left turn.

Similarly, the DSECU 10 obtains, as a right front end moving path SR, a line obtained by shifting the center point moving path SC rightward in the body width direction by the distance d. More precisely, the right front end moving path SR is a circular arc having a radius (R1−d) around the center of turning when the host vehicle SV is making a right turn, and is a circular arc having a radius (R1+d) around the center of turning when the host vehicle SV is making a left turn.

The host vehicle passing area SP is obtained/predicted as a belt-like area between (defined by) the left front end moving path SL and the right front end moving path SR.

It should be noted that the distance d is a value (=(W/2)+Mg) obtained by adding a half of a width (W) of the host vehicle SV to a predetermined margin Mg. Note that the margin Mg may be "0".

<<Prediction of the Other Vehicle Passing Area>>

The DSECU 10 determines/obtains "a turning radius R2 and a center of turning" of the other vehicle PV at the present time point, based on "the fusion target object information" of the other vehicle PV at the present time point and in the past and "the host vehicle behavior information" of the host vehicle SV at the present time point and in the past. Thereafter, the DSCEU determines (predicts) a "center point moving path PC that is a path along/on which a front end center of the other vehicle PV will move within the prediction period", based on the turning radius R2 and the center of turning, under the assumption that the other vehicle PV moves/runs while maintaining the present state in the prediction period.

Then, the DSECU 10 obtains, as a left front end moving path PL, a line obtained by shifting the center point moving path PC leftward in the body width direction of the other vehicle PV by a distance dp. More precisely, the left front end moving path PL is a circular arc having a radius (R2+dp) around the center of turning when the other vehicle PV is making a right turn, and is a circular arc having a radius (R2−dp) around the center of turning when the other vehicle PV is making a left turn.

Similarly, the DSECU 10 obtains, as a right front end moving path PR, a line obtained by shifting the center point moving path PC rightward in the body width direction of the other vehicle PV by the distance dp. More precisely, the right front end moving path PR is a circular arc having a radius (R2−dp) around the center of turning when the other vehicle PV is making a right turn, and is a circular arc having a radius (R2+dp) around the center of turning when the other vehicle PV is making a left turn.

The DSECU 10 extends each of the left front end moving path PL and the right front end moving path PR to a rear end of the other vehicle PV, and predicts/obtains, as the other vehicle passing area PP, a belt-like area between (defined by) the extended left front end moving path PL and the extended right front end moving path PR.

It should be noted that the distance dp is a value (=(Wp/2)+Mgp) obtained by adding a half of a width (Wp) of the other vehicle PV to a predetermined margin Mgp. Note that the margin Mgp may be "0". Even when the detected target object is an object other than a vehicle, the DSECU 10 predicts a passing area of the object as an object passing area, similarly to the method described above.

At step 420, the CPU determines whether or not the host vehicle passing area SP and the other vehicle passing area (target object passing area) PP intersect with each other. In other words, the CPU determines whether or not a target object (namely, a control target object) having the other vehicle passing area PP that intersects with the host vehicle passing area SP is present. When the control target object is not present. the CPU makes a "No" determination at 420, and directly proceeds to step 495 to terminate the present routine tentatively. Thus, in this case, the warning control as the collision avoidance control is not performed.

Whereas, when the control target object is present, the CPU makes a "Yes" determination at 420, and proceeds to step 425.

At step 425, the CPU determines whether or not the host vehicle SV is turning. More specifically, the CPU determines whether or not the turning radius R1 obtained at step 420 to predict the host vehicle passing area SP is equal to or smaller than a predetermined radius threshold (R1th). It should be noted that the determination as to whether or not the host vehicle SV is turning can be made using methods other than the above-described method. For example, the CPU may determine that the host vehicle SV is turning when at least one of magnitudes of "the yaw rate Yr, the lateral acceleration Gy, and the steering angle θ" is equal to or greater than a corresponding turning threshold.

When the host vehicle SV is not turning (i.e., when the turning radius R1 is greater than the radius threshold R1th), the CPU makes a "No" determination at step 425, and proceeds to step 430.

At step 430, the CPU sets the collision avoidance time threshold TTCth (in the present example, the warning time threshold TWth) to a traveling-straight time threshold Tlong, and proceeds to step 435.

At step 435, the CPU calculates the time to collision TTC of the control target object. In addition, the CPU determines whether or not the time to collision TTC of the control target object is equal to or shorter than the collision avoidance time threshold TTCth (in the present example, the warning time threshold TWth). When the time to collision TTC of the control target object is longer/greater than the collision avoidance time threshold TTCth, the CPU makes a "No" determination at step 435, and directly proceeds to step 495 to terminate the present routine tentatively. Thus, in this case, the warning control as the collision avoidance control is not performed.

Whereas, when the time to collision TTC of the control target object is equal to or shorter than the collision avoidance time threshold TTCth, the CPU makes a "Yes" determination at step 435, and sequentially executes processes of step 440 and step 445. Thereafter, the CPU proceeds to step 495 to terminate the present routine tentatively.

Step 440: the CPU sets the value of the flag XPCS to "1".

Step 445: the CPU performs the above-described warning control as the collision avoidance control. More specifically, the CPU transmits the display instruction to the meter ECU 20, and transmits the sound generating instruction to the sound generating device 70.

If the host vehicle SV is turning (i.e., when the turning radius R1 obtained to predict the host vehicle passing area SP is equal to or smaller than the radius threshold R1th) when the CPU proceeds to step 425, the CPU makes a "Yes" determination at step 425, and proceeds to step 450.

At step 450, the CPU sets the collision avoidance time threshold TTCth (in the present example, the warning time threshold TWth) to "a turning time threshold Tshort that is shorter/smaller than the traveling-straight time threshold Tlong. Thereafter, the CPU proceeds to step 455.

At step 455, the CPU determines whether or not the continuous recognizing time Trcg of the control target object is equal to or longer/greater than the continuous recognizing time threshold Trth.

When the continuous recognizing time Trcg is shorter than the continuous recognizing time threshold Trth, the CPU makes a "No" determination at step 455, and directly proceeds to step 495 to terminate the present routine tentatively. Thus, in this case (where Trcg<Trth), the warning control as the collision avoidance control is not started/performed (or is prohibited).

Whereas, when the continuous recognizing time Trcg is equal to or longer/greater than the continuous recognizing time threshold Trth, the CPU makes a "Yes" determination at 455, and proceeds to step 435. Therefore, when the time to collision TTC of the control target object is equal to or shorter than the collision avoidance time threshold TTCth (in the present example, the warning time threshold TWth that has been set to the turning time threshold Tshort), the CPU sequentially executes the above-described processes of "step 440 and step 445" so as to perform the warning control as the collision avoidance control. Thereafter, the CPU proceeds to step 495 to terminate the present routine tentatively.

As has been described above, according to the collision avoidance assistance apparatus 1, when it is determined that the host vehicle SV is turning, the collision avoidance control is not started even when the time to collision TTC of the control target object is equal to or shorter than "the collision avoidance time threshold TTCth that is set to a value smaller than the value of the collision avoidance time threshold TTCth used when the host vehicle SV is not turning" if the continuous recognizing time Trcg of the control target object is shorter than the continuous recognizing time threshold Trth. Furthermore, when the continuous recognizing time Trcg of the control target object is longer than the continuous recognizing time threshold Trth, a timing at which the collision avoidance control starts to be performed in the case where the host vehicle SV is turning is substantially delayed, as compere to the case where the vehicle SV is not turning. Thus, the collision avoidance assistance apparatus 1 can decrease the possibility that the collision avoidance control is unnecessarily performed when the host vehicle SV make a right or a left turn in the intersection.

It should be noted that the DSECU 10 can perform the automatic brake control as the collision avoidance control as follows.

At step 430, the CPU sets the collision avoidance time threshold TTCth to a "traveling-straight time threshold for automatic brake Tlongbk" that is shorter than the traveling-straight time threshold Tlong.

At step 450, the CPU sets the collision avoidance time threshold TTCth to a "turning time threshold for automatic brake Tshortbk" that is shorter than the traveling-straight time threshold for automatic brake Tlongbk. The turning time threshold for automatic brake Tshortbk is shorter than the turning time threshold Tshort.

At step 445, the CPU performs the above-described automatic brake control. More specifically, the CPU transmits the automatic brake instruction to the brake ECU 30.

(First Modification 1)

A first modification of the collision avoidance assistance apparatus 1 is different from the collision avoidance assistance apparatus 1 only in that it varies the collision avoidance time threshold TTCth depending on the overlap rate LR.

The CPU (hereinafter, simply referred to as a "CPU1" of the DSECU 10 according to the first modification 1 is configured or programmed to execute a routine shown by a flowchart in FIG. 5 in place of the flowchart in FIG. 4, every time a predetermined time elapses. The routine shown in FIG. 5 is to perform the above-described warning control as the collision avoidance control. It should be noted that a routine similar to the routine shown in FIG. 5 enables the CPU to perform the above-described automatic brake control as the collision avoidance control.

The routine shown in FIG. 5 is different from the routine shown in FIG. 4 only in the following points.

Step 430 shown in FIG. 4. is replaced by step 530.
Step 450 shown in FIG. 4. is replaced by step 550.
Step 570 is added to the routine shown in FIG. 4.
Those differences will mainly be described with reference to FIG. 5.

When the host vehicle SV is not turning, the CPU1 makes a "No" determination at step 425, and proceeds to step 530. At step 530, the CPU1 sets a collision avoidance time reference threshold TTCbth (in the present example, a warning time reference threshold TWbth) to a traveling-straight time threshold Tlong, and proceeds to step 570.

Whereas, when the host vehicle SV is turning, the CPU1 makes a "Yes" determination at step 425, and proceeds to step 550. At step 550, the CPU1 sets the collision avoidance time reference threshold TTCbth (in the present example, the warning time reference threshold TWbth) to "a turning time threshold Tshort shorter/smaller than the traveling-straight time threshold Tlong". Thereafter the CPU1 proceeds to step 455.

When the continuous recognizing time Trcg is shorter than the continuous recognizing time threshold Trth, the CPU makes a "No" determination at step 455, and directly proceeds to step 495 to terminate the present routine tentatively. Thus, in this case (where Trcg<Trth), the warning control as the collision avoidance control is not started/performed (or is prohibited). Therefore, the possibility that the unnecessary collision avoidance control is performed can be decreased.

Whereas, when the continuous recognizing time Trcg is equal to or longer/greater than the continuous recognizing time threshold Trth, the CPU1 makes a "Yes" determination at 455, and proceeds to step 570.

At step 570, the CPU1 obtains the above-described overlap rate LR, and obtains a value of the above-described function f(LR) based on the obtained overlap rate LR (refer to the block Map shown in FIG. 5). As described above, the overlap rate LR is a value that is indicative of a degree of overlapping between the host vehicle SV and the control target object OV at the time of collision between the two (LR=LL/(2·d)) (refer to FIG. 6). Thereafter, the CPU1 determines (obtains) the collision avoidance time threshold TTCth (in the present example, the warning time threshold TWth) by multiplying the value of the function f(LR) by the collision avoidance time reference threshold TTCbth (in the present example, the warning time reference threshold TWbth).

Accordingly, assuming that the overlap rate LR is equal to an arbitrary value LR1, the collision avoidance time threshold TTCth (in the present example, the warning time threshold TWth) is smaller when the host vehicle SV is turning than when the host vehicle SV is not turning. Therefore, the possibility that the unnecessary collision avoidance control is performed can be decreased.

(Second Modification 2)

A second modification of the collision avoidance assistance apparatus 1 is different from the collision avoidance assistance apparatus 1 only in that it obtains "the host vehicle behavior information used to predict the host vehicle passing area SP and/or the host vehicle behavior information used to determine whether or not the host vehicle SV is turning" from a device outside of the host vehicle SV via the communication device 80. The thus configured second modification of the collision avoidance assistance apparatus 1 can predict the host vehicle passing area SP with high accuracy, and/or can determine determine whether or not the host vehicle SV is turning with high accuracy.

As understood from the above, the embodiment and the modifications according to the present disclosure can decrease the possibility that the unnecessary collision avoidance control is performed when the host vehicle SV is turning. The present disclosure should not be limited to the above-described embodiment and the modifications, and may employ various other modifications within the scope of the present disclosure.

For example, the collision avoidance assistance apparatus 1 may be configured to obtain information on an other target object that is present in front of or around of the host vehicle SV through the communication device 80, and make use of the thus obtained information in addition to the target object information obtained by the target object sensor device 40 for the collision avoidance control. The collision avoidance assistance apparatus 1 can be applied to and installed in an autonomous driving vehicle.

The collision avoidance assistance apparatus 1 may be configured to perform only one of the warning control and the automatic brake control, as the collision avoidance control, or may be configured to perform the PCS control that is neither the warning control nor the automatic brake control, in addition to or in place of the warning control and/or the automatic brake control. Examples of the PCS control other than the warning control and the automatic brake control include an automatic seatbelt winding control and a collision avoidance steering control.

The embodiment and the modifications according to the present disclosure does not start the collision avoidance control that is designed to be triggered when the time to collision TTC as the collision index value reaches the collision avoidance time threshold TTCth, for the target object whose continuous recognizing time Trcg has not reached the continuous recognizing time threshold Trth, when the host vehicle SV is turning. However, each of them may be configured to start/perform that the collision avoidance control for the target object whose continuous recognizing time Trcg has not reached the continuous recognizing time threshold Trth, when another condition becomes satisfied in addition to the condition to be satisfied when the time to collision TTC as the collision index value reaches the collision avoidance time threshold TTCth, when the host vehicle SV is turning.

What is claimed is:

1. A collision avoidance assistance apparatus comprising:
a target object sensor which detects a target object present ahead of a host vehicle and outputs target object information including information on a position of said target object which is detected;
an information obtaining sensor which obtains host vehicle behavior information indicative of a behavior of said host vehicle;
an electronic control unit, including a processor, configured to, when determining, based on said target object information and said host vehicle behavior information, that a control target object having a possibility of colliding with said host vehicle is present, produce a collision index value indicative of said possibility based on at least said target object information of said control target object, and perform a collision avoidance control to prevent a collision between said host vehicle and said control target object using an actuator of said host vehicle,
wherein said electronic control unit is configured to:
in a case where it is determined that said host vehicle is turning based on the host vehicle behavior information, start said collision avoidance control when said collision index value satisfies a first control start condition and a continuous recognizing time indicating a time for which said control target object continues being detected by said target object sensor is longer than a predetermined continuous recognizing time threshold so as not to start said collision avoidance control when said continuous recognizing time is shorter than said predetermined continuous recognizing time threshold even when said collision index value satisfies said first control start condition; and
in a case where it is determined that said host vehicle is not turning based on said host vehicle behavior information, start said collision avoidance control when said collision index value satisfies a second control start condition regardless of whether or not said continuous recognizing time is longer than said predetermined continuous recognizing time threshold.

2. The collision avoidance assistance apparatus according to claim 1,
wherein, said control unit is configured to:
calculate, as said collision index value, a time to collision that is a time length to a time point at which said host vehicle is predicted to collide with said control target object;
determine that said first control start condition becomes satisfied, when said time to collision is equal to or shorter than a first collision avoidance time threshold, and determine that said second control start condition becomes satisfied, when said time to collision is equal to or shorter than a second collision avoidance time threshold that is greater than said first collision avoidance time threshold.

3. A collision avoidance control method comprising:

a step of obtaining target object information including information on a position of a target object present ahead of a host vehicle from a target object sensor which detects said target object and produces said target object information;

a step of obtaining host vehicle behavior information indicative of a behavior of said host vehicle;

a step of producing, when it is determined, based on said target object information and said host vehicle behavior information, that a control target object having a possibility of colliding with said host vehicle is present, a collision index value indicative of said possibility based on at least said target object information of said control target object;

a step of starting, in a case where it is determined that said host vehicle is turning based on the host vehicle behavior information, a collision avoidance control to prevent a collision between said host vehicle and said control target object using an actuator of said host vehicle when said collision index value satisfies a first control start condition, and a continuous recognizing time indicating a time for which said control target object continues being detected by said target object sensor longer than a predetermined continuous recognizing time threshold so as not to start said collision avoidance control when said continuous recognizing time is shorter than said predetermined continuous recognizing time threshold even when said collision index value satisfies said first control start condition; and a step of starting, in a case where it is determined that said host vehicle is not turning based on said host vehicle behavior information, said collision avoidance control when said collision index value satisfies a second control start condition regardless of whether or not said continuous recognizing time is longer than said predetermined continuous recognizing time threshold.

4. A non-transitory storage medium, storing a program causing a computer to implement functions of:

obtaining target object information including information on a position of a target object present ahead of a host vehicle from a target object sensor which detects said target object and produces said target object information;

obtaining host vehicle behavior information indicative of a behavior of said host vehicle;

producing, when it is determined, based on said target object information and said host vehicle behavior information, that a control target object having a possibility of colliding with said host vehicle is present, a collision index value indicative of said possibility based on at least said target object information of said control target object;

starting, in a case where it is determined that said host vehicle is turning based on the host vehicle behavior information, a collision avoidance control to prevent a collision between said host vehicle and said control target object using an actuator of said host vehicle when said collision index value satisfies a first control start condition, and a continuous recognizing time indicating a time for which said control target object continues being detected by said target object sensor longer than a predetermined continuous recognizing time threshold so as not to start said collision avoidance control when said continuous recognizing time is shorter than said predetermined continuous recognizing time threshold even when said collision index value satisfies said first control start condition; and starting, in a case where it is determined that said host vehicle is not turning based on said host vehicle behavior information, said collision avoidance control when said collision index value satisfies a second control start condition regardless of whether or not said continuous recognizing time is longer than said predetermined continuous recognizing time threshold.

* * * * *